United States Patent Office.

HENRY HANS FREUND, OF WEEHAWKEN HEIGHTS, NEW JERSEY.

ART OF BREWING.

1,119,504. Specification of Letters Patent. Patented Dec. 1, 1914.

No Drawing. Application filed April 3, 1913. Serial No. 758,535.

*To all whom it may concern:*

Be it known that I, HENRY HANS FREUND, a citizen of the United States, and a resident of Weehawken Heights, State of New Jersey, have invented certain new and useful Improvements in the Art of Brewing, of which the following is a specification.

My invention relates to an improvement in one of the steps of the art of brewing and has for its object more particularly to remove from the malt husks such of their soluble ingredients which, if the hulls were mashed in the mash tub, would give the beer a disagreeable after-taste and diminish its brilliancy.

In the mashing process, as generally practised today, the entire malt, after crushing, is mashed in the mash tub, or partly in the mash tub and partly in the converter. The fact that mashing of the hulls is deleterious to the beer has been recognized, and the suggestion has been made, and in part carried out, to mash the hulls and part of the flour in the mash tub at a very low temperature and to mash the remainder of the flour body at high temperature in a separate vessel. However, mashing at a low temperature has the disadvantage of incompletely converting the flour into extract, and moreover in the subsequent sparging process to which the hulls must be subjected, which takes place at the high temperatures of 58 to 60° R. (72.5 to 75° C.) a large part of the undesirable extract is removed from the hulls and thus incorporated in the finished product. That such substances are actually extracted from the hulls at that temperature can easily be ascertained by pouring water of from 58 to 60° R. (72.5 to 75° C.) onto hulls and then filtering, the filtrate being a cloudy opalescent liquid which has a raw, straw-like taste.

My process consists essentially in separating the hulls from the remainder of the flour body, then boiling the hulls in water or other suitable liquid, discarding the resultant extract and then returning the hulls to the mash tub. By this process the possibility of adding the deleterious ingredients of the hulls to the finished product is obviated, while the mashing process is not deprived of the hulls which are necessary to make possible the subsequent filtering operation. The return of the malt hulls to the mash tub renders unnecessary the use of foreign substances for the purpose of securing proper conversion and proper filtering and enable the mashing process to be carried on with the aid of a substance which is peculiarly well adapted for the purpose.

The following is a specific example of my process, but I desire it to be understood that the same may be varied without departing from the spirit of my invention, as outlined in the appended claim. The malt is ground in a suitable manner and the hulls separated out by well known means. The flour body is placed into the mash tub while the hulls are passed between suitable rollers, so as not to be too much broken up but to have any mealy portions adhering to the hulls removed or loosened. The resulting mixture of hulls and mealy portions is passed through sieves of any suitable construction so as to separate the mealy portions as much as possible from the hulls. The agitation of the hulls by the moving sieve will tend to loosen the mealy portions still remaining attached to such hulls, so that the friction of the hulls upon the sieve and the friction of the hulls among each other finally tears off substantially all the still remaining mealy portion, which then passes through the sieve. The separated mealy portions are then placed into the mash tub while the hulls are carried to a boiler filled with hot water. The boiler may be provided with a perforated bottom and with stirring means, and the water may also be added by suitable means after the hulls have been introduced into the boiler. The hulls are treated with the water at a suitable temperature, which is preferably 60 to 80° R. (75 to 100° C.) for a sufficient length of time to remove the deleterious ingredients from the hulls, the water together with such ingredients is removed and the hulls are carried by suitable means to the mash tub. The contents of the mash tub are then thoroughly stirred in order that the hulls may be thoroughly distributed in the mash. During the filtering operation the hulls will form the usual filtering strata which insure rapid filtration. As the deleterious ingredients have all been removed from the hulls, the hulls may be sparged in the mash tub without fear of injury to the finished product.

I claim:

The improvement in the art of mashing which consists in separating the hulls from the remainder of the malt body, treating the hulls in water so as to extract the deleterious ingredients, separating the hulls from the water and the ingredients and then adding the hulls to the remainder of the malt body in the mash tub.

In testimony whereof I have hereunto set my hand in the presence of two subscribing witnesses.

HENRY HANS FREUND.

Witnesses:
LOUELLA F. LITTLE,
H. M. BAYLES.